United States Patent
Cella Mazzariol et al.

(10) Patent No.: US 8,961,281 B2
(45) Date of Patent: Feb. 24, 2015

(54) VENTILATION GROUP FOR FLOW REVERSAL

(75) Inventors: Pietro Paolo Cella Mazzariol, Tortona (IT); Gianfrancesco Galanzino, Tortona (IT)

(73) Assignee: Entsorgafin S.p.A., Tortona (IT)

(*) Notice: Subject to any disclaimer, the term of this patent is extended or adjusted under 35 U.S.C. 154(b) by 1549 days.

(21) Appl. No.: 12/568,519

(22) Filed: Sep. 28, 2009

(65) Prior Publication Data

US 2011/0076935 A1 Mar. 31, 2011

(51) Int. Cl.
*C02F 3/02* (2006.01)
*C05F 17/02* (2006.01)
*B32B 27/12* (2006.01)
*C02F 3/00* (2006.01)
*F04D 27/00* (2006.01)

(52) U.S. Cl.
CPC ............ *C05F 17/0258* (2013.01); *B32B 27/12* (2013.01); *C02F 3/00* (2013.01); *F04D 27/005* (2013.01)
USPC ........................................ 454/251; 435/290.1

(58) Field of Classification Search
CPC ............ C02F 3/00; C02F 3/02; C05F 17/028; B32B 27/12; F04D 27/005
USPC ............... 454/251; 71/9; 137/625.19, 625.43, 137/884; 435/290.1
See application file for complete search history.

(56) References Cited

U.S. PATENT DOCUMENTS

| 1,959,106 | A | | 5/1934 | Messing |
| 3,895,916 | A | | 7/1975 | Rösner |
| 4,310,020 | A | * | 1/1982 | Jespersen et al. ............. 137/563 |
| 4,623,001 | A | * | 11/1986 | Vogler et al. ............. 137/625.46 |
| 5,911,243 | A | * | 6/1999 | Cohen ........................ 137/625.46 |
| 6,207,447 | B1 | * | 3/2001 | Gould ........................ 435/290.1 |
| 6,308,739 | B1 | * | 10/2001 | Barbuto et al. .......... 137/625.19 |
| 7,000,425 | B2 | * | 2/2006 | Army, Jr. et al. ............... 62/401 |
| 7,520,298 | B2 | * | 4/2009 | George et al. ............ 137/625.21 |
| 7,600,535 | B2 | * | 10/2009 | Baumgarten et al. .... 137/625.43 |
| 7,717,061 | B2 | * | 5/2010 | Ishizaka et al. ........ 118/723 MP |

FOREIGN PATENT DOCUMENTS

| EP | 1 431 262 B1 | 1/2007 |
| GB | 1 381 848 A | 1/1975 |

* cited by examiner

*Primary Examiner* — Steven B McAllister
*Assistant Examiner* — Frances H Kamps
(74) *Attorney, Agent, or Firm* — Sughrue Mion, PLLC (57) ABSTRACT

The present invention concerns a ventilation group that is capable of causing reversal of a gas flow according to two opposite directions, and that can be applied, in particular, to plants for the aerobic treatment of organic wastes through a phase of fermentation/bio-oxidation performed by means of forced air.

14 Claims, 7 Drawing Sheets

VENTILATION GROUP FOR FLOW REVERSAL

TECHNICAL FIELD OF THE INVENTION

The present invention concerns a ventilation group capable of reversing a gas flow according to two opposite directions.

More precisely, the present invention concerns a. ventilation group capable of reversing, according to two opposite directions, a gas flow generated by a fan, without reversing the fan rotation direction.

In particular, the present invention concerns a ventilation group capable of reversing, according to two opposite directions, a gas flow that can be applied to plants for the aerobic treatment of organic wastes.

BACKGROUND OF THE INVENTION

An example of a plant for the aerobic treatment of organic wastes is disclosed in GB 1 381 848. Said plant, that comprises an enclosed room, having a ventilating support surface on which waste heaps are placed, uses a blower for sucking or blowing air through the heaps. That solution is limited from the operating standpoint, in that the blower, unless its rotation direction is reversed, can only operate by sucking or blowing air in the same direction.

Another exemplary plant for the aerobic treatment of organic wastes is disclosed in European Patent No. EP 1 431 262, in the name of the same Applicant.

Such a plant, housed within an enclosed building, has a ventilated paving or floor on which heaps of organic wastes are deposited, the aerobic treatment of said organic wastes taking place through a phase of fermentation/bio-oxidation performed by means of forced air. Said plant further includes means for generating an alternating air flow in two opposite directions, through said paving and said heaps, which means preferably consist of fans, pairs of three-way valves and by-passes for reversing in continuous manner the air flow generated by said fans.

A drawback of the above solution is its construction and management complexity, resulting in a non-negligible resource burden: indeed, a rather complex circuit is to be provided where each valve requires a dedicated actuator, what makes the system very onerous.

The above solution is moreover limited from the operating standpoint, in that each assembly formed by a fan, valves and by-passes can only operate either by sucking used-up air from the room containing the organic wastes in order to exhaust that air to the outside, or by sucking fresh air from the outside to blow it into the room containing said organic wastes.

Systems for reversing the direction of a gas flow without stopping or changing the fan rotation direction are also known, e.g. from U.S. Pat. No. 1,959,106, said systems operating thanks to a set of stationary propellers and partitions that are axially moved as an integral unit by means of a single actuator, whereby the gas flow can simultaneously flow according two opposite directions.

SUMMARY OF THE INVENTION

The Applicant has now found a solution that allows generating a flow alternating according two opposite directions and moreover, optionally, sucking fresh air from the outside, by using a single fan and a valve set controlled by a single actuator.

Advantageously, in the ventilation group for flow reversal according to the invention, the fan operates in continuous manner and without reversing its rotation direction, whereas flow reversal takes place by acting only on the valves by means of a single actuator.

Advantageously, moreover, the ventilation group for flow reversal according to the invention is very compact and has a limited number of moving mechanical parts, what contributes to keeping the installation and management costs limited.

BRIEF DESCRIPTION OF THE DRAWINGS

The ventilation group for flow reversal according to the present invention will now be described in greater detail with reference to the accompanying drawings, given by way of non-limiting examples, in which.

DETAILED DESCRIPTION OF THE INVENTION

Referring to FIGS. 1 to 4, it can be seen that ventilation group 1 comprises a suitably shaped housing 10, to be connected to a fan 2 which is to move the air flow to be processed, by conferring it the desired flow rate, prevalence and direction.

Housing 10, in the illustrated embodiment, comprises three different sections: a first section 10a, which in the illustrated example has a half-cylinder shape, a second section 10b, which in the illustrated example has a parallelepiped shape with rectangular cross section, and a third section 10c, which in the illustrated example has a parallelepiped shape with square cross section. Yet, any other shape of housing 10 enabling the flow direction reversal can be adopted, for instance a shape including a single section or only two sections of housing 10 in place of the three sections provided by the illustrated embodiment.

The second section 10b is connected, at one end, to the first section 10a so as to form an L-shaped structure, and, at the end opposite with respect to said first section 10a, it is connected to the third section 10c, which therefore forms an extension thereof. Said "L" shape favours the positioning of fan 2, which usually is equipped with a suction duct 2a and a delivery duct 2b arranged at 90° relative to each other, but also other shapes can be adopted.

Figure 2:
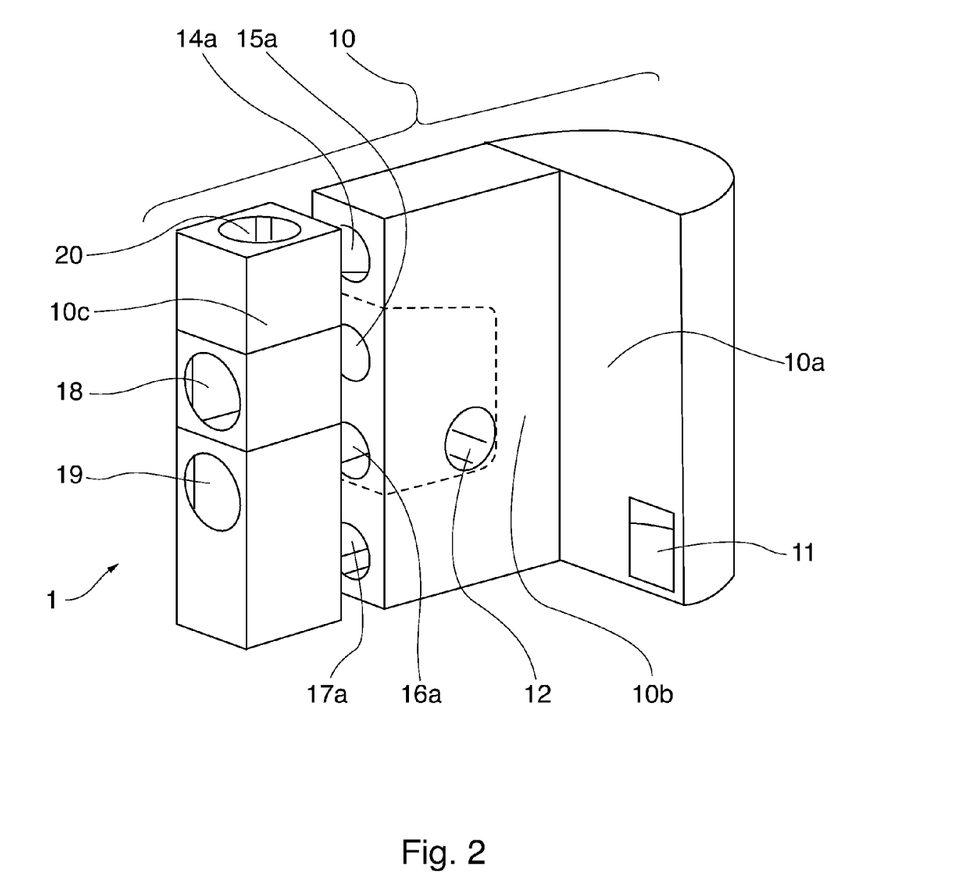
FIG. 2 is a perspective view of the opposite side of the ventilation group shown in FIG. 1.

The first section 10a is substantially empty and has a first opening 11, shown in FIG. 2, preferably intended for connection of delivery duct 2b of fan 2.

Figure 1:
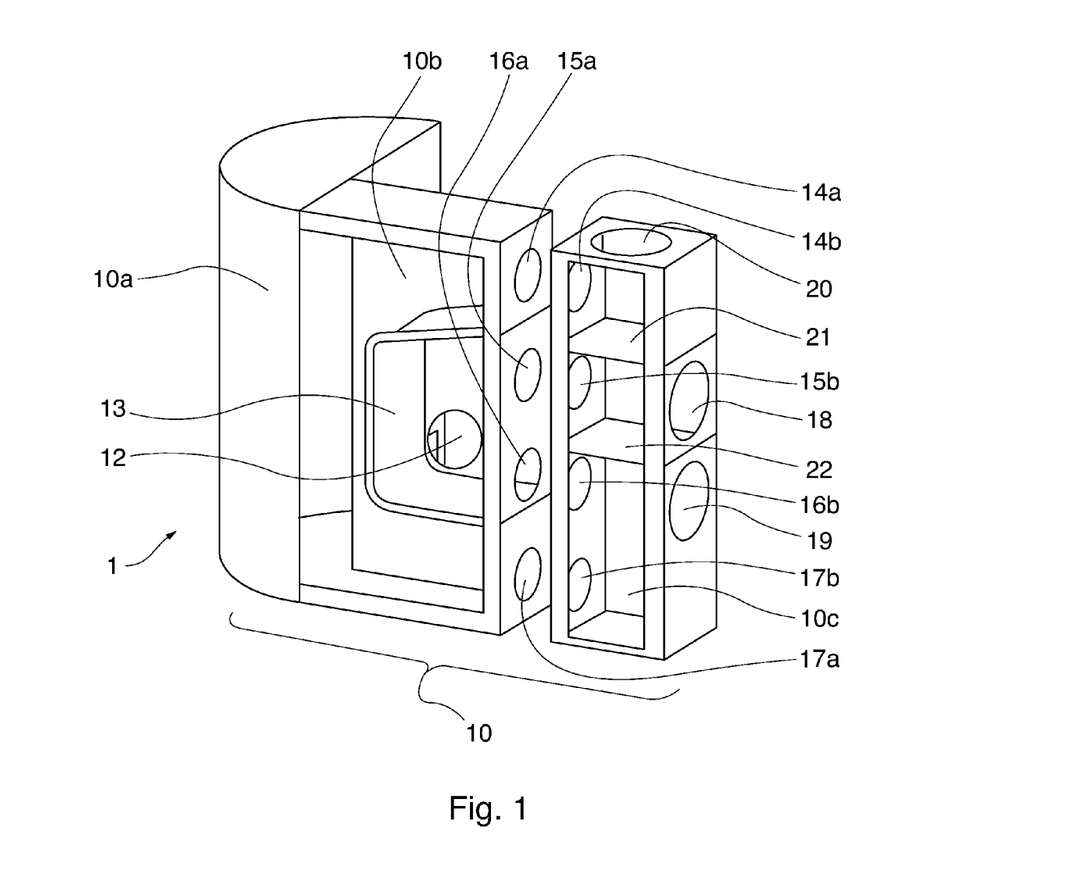
FIG. 1 is a perspective view of one side of the ventilation group according to an embodiment of the invention, in partially open condition.

The second section 10b, which has a second opening 12, also shown in FIG. 1 and preferably intended for connecting suction duct 2a of fan 2, includes a baffle 13 and four first internal holes 14a, 15a, 16a and 17a. Said baffle 13 is so located that it internally encloses central holes 15a and 16a out of said four first internal holes as well as said second opening 12.

The third section 10c includes four second internal holes 14b, 15b, 16b and 17b corresponding to and facing said first internal holes 14a, 15a, 16a and 17a, so as to define the seats of valves V1, V2, V3 and V4. The third section 10c further includes at least one first and one second external holes 18 and 19, which in the illustrated example are located on the face opposite that having said four second internal holes 14b, 15b, 16b and 17b, and a third external hole 20. In the illustrated embodiment, the third hole is horizontally located on the face opposite the face by which said third section 10c rests on the ground, but it can also be differently located, for instance on the same vertical face as that having said first and second external holes 18 and 19. The third section 10c further includes at least first and second partitions 21 and 22, which can be movable and are preferably located upstream and downstream said first external hole 18, respectively.

In the illustrated embodiment, the first external hole 18 is intended for connection with the external environment and fresh air to be sent to the plant for waste treatment is sucked from the external environment just through said first external hole 18.

In an alternative embodiment of the present invention, which will be disclosed in detail later on, said first external hole 18 is closed by a closing plate 23, shown in FIGS. 7A, 7B and 8A, 8B.

The second external hole 19 is intended for connection with the ventilated paving or floor of the plant for waste treatment and, just through said second external hole 19, either used-up air is sucked that is to be sent to the outside, preferably after having been treated in a suitable bio-filter, and/or to a manifold of the plant for waste treatment, or fresh or used up air is blown to the paving itself.

The third external hole 20 is intended for connection to a bio-filter and/or a manifold of the plant for waste treatment, and depurated used-up air can be exhausted to the external environment just through said third external hole 20. In an alternative embodiment of the present invention, said third external hole 20 can be connected to the manifold collecting used-up air from the plant for waste treatment, as disclosed below with reference to FIGS. 7A, 7B and 8A, 8B.

Figure 10:
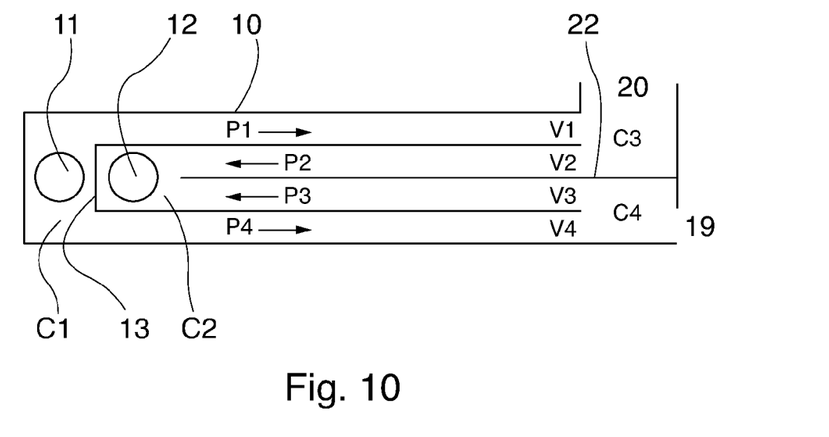
FIG. 10 is a schematic representation of the ventilation group according to the invention, where the gas flow paths inside said ventilation group are highlighted.

Turning to FIG. 10, where ventilation group 1 according to the invention is schematically shown, it can be seen that, thanks to the provision of baffle 13, two spaces communicating with suction duct 2a (at 12) and delivery duct 2b (at 11) of fan 2 are defined inside housing 10. More precisely, there are defined:

a first chamber C1, defined outside said baffle 13 and communicating with said first opening 11, which chamber receives the flow blown by fan 2;

a second chamber C2, defined inside said baffle 13 and communicating with said second opening 12, wherefrom the flow is sucked into fan 2;

a first pair of paths P1 and P4 for the ventilation flow, associated with said first chamber C1 external to baffle 13;

a second pair of paths P2 and P3 for the ventilation flow, associated with said second chamber C2 internal to baffle 13;

a third chamber C3 associated with a first path P1 in said first pair of paths P1 and P4 and a first path P2 in said second pair of paths P2 and P3, said third chamber C3 being equipped with the third external hole 20;

a fourth chamber C4 associated with a second path P3 in said second pair of paths P2 and P3 and a second path P4 in said first pair of paths P1 and P4, said fourth chamber C4 being equipped with the second external hole 19; wherein said paths P1, P2, P3 and P4 are intercepted by corresponding valves V1, V2, V3 and V4 that may take, in pairs, a closed or an open configuration such that only one path at a time in each pair of paths is activated, whereas the other two paths are deactivated.

In this embodiment valve V1 intercepts path P1, valve V2 intercepts path P2, valve V3 intercepts path P3 and valve V4 intercepts path P4.

Figure 11:
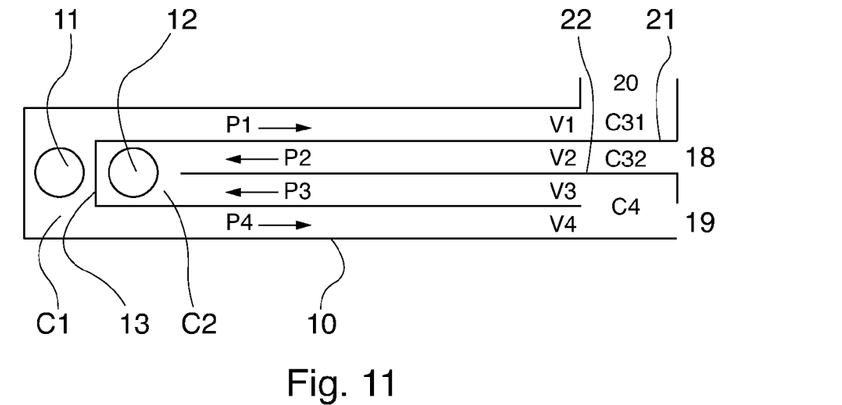
FIG. 11 is a schematic representation of the ventilation group according to the alternative embodiment of the invention, where the gas flow paths inside said ventilation group are highlighted.

Turning to FIG. 11, where ventilation group 1 according to the alternative embodiment of the invention is schematically shown, it can be seen that said third chamber C3 is divided into two sub-chambers C31 and C32, where said first sub-chamber C31 is equipped with the third external hole 20 and is associated with said first path P1 in said first pair of paths P1 and P4, and said second sub-chamber C32 is equipped with the first external hole 18 and is associated with said first path P2 in said second pair of paths P2 and P3.

In such an alternative embodiment of the present invention, valve V1 intercepts said path P1, valve V2 intercepts said path P2, valve V3 intercepts said path P3 and valve V4 intercepts said path P4.

As it can be seen in FIGS. 10 and 11, the flows passing through said valves V1 and V4 flow in opposite direction with respect to those passing through said valves V2 and V3 and, more precisely, in the suction and the delivery directions, respectively, of fan 2.

Figure 3:
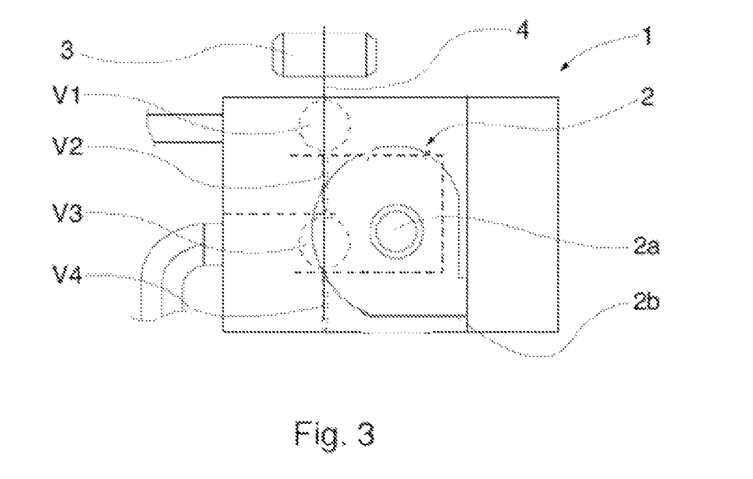
FIG. 3 is a schematic side view of the ventilation group according to an embodiment of the invention, showing the fan and the valve actuating system.
Figure 4:
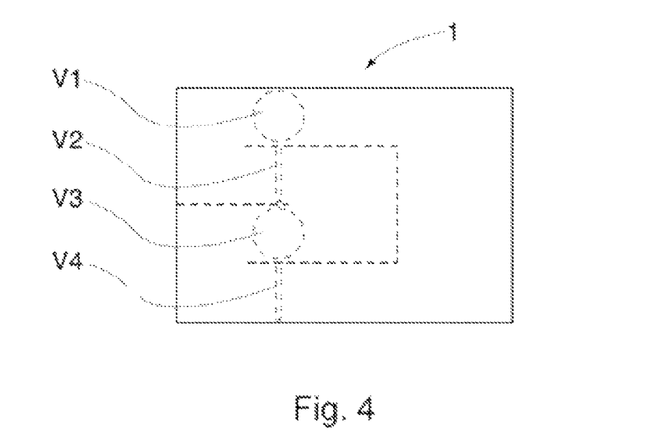
FIG. 4 shows a detail of FIG. 3, illustrating the offset of the valve pairs.

Turning to FIGS. 3 and 4, it can be seen that four valves, preferably throttle valves, V1, V2, V3 and V4, are mounted inside housing 10. Said valves, when suitably actuated, adjust the direction of the gas flow, whilst the flow rate and the relevant prevalence of the gas flow are adjusted, for instance, by means of a frequency modulator acting upon the fan motor by adjusting its speed.

The four valves V1, V2, V3 and V4 are simultaneously actuated by a single linear actuator 3, preferably an electric motor, connected to the valves through a rotatable rod or a connecting rod-crank mechanism 4.

The four valves V1, V2, V3 and V4 are mounted in the seats formed by the pairs of first and second internal holes 14a, 14b, 15a, 15b, 16a, 16b and 17a, 17b, respectively. More particularly, in the illustrated example, such valves, besides being mounted in line, are initially positioned so that opening and closing thereof is offset, so as to allow reversal of the air flow to be processed by rotating the single rod 4: otherwise stated, it is necessary that valves V1 and V3 are open and valves V2 and V4 are closed or vice versa. For that reason, in the illustrated example, valves V1 and V3 are arranged parallel to each other and oriented at 90° relative to valves V2 and V4.

When the air flow is to be reversed, the position of each of said four valves V1, V2, V3 and V4 will be switched thanks to the movement of linear actuator 3, resulting in a configuration where valves V1 and V3 are closed and valves V2 and V4 are open, or viceversa.

Turning now to FIGS. 5A to 8B, the operation of the ventilation group according to the present invention will be described in detail. By convention, four different flow types, which will be referred to in following description, are herein defined:

flow A is a flow of used-up air that it sucked from the paving of the plant for waste treatment and sent to the external environment after having processed in a bio-filter;

flow B is an air flow coming from the external environment and sent to the paving of the plant for waste treatment;

flow C is a flow of used-up air that is sucked from a manifold of the plant for the treatment of organic wastes and is sent to the paving of the plant for waste treatment;

flow D is a flow of used-up air that is sucked from the paving of the plant for waste treatment and is sent either to the external environment, after having processed in a bio-filter, or to the manifold of the plant for the treatment of organic wastes, or partly to the external environment and partly to the manifold.

Figures 5A, 5B:
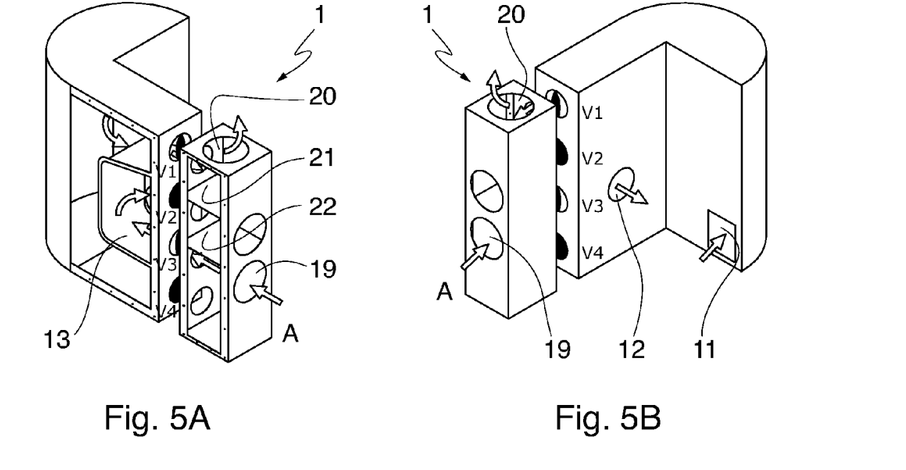
FIGS. 5A and 5B show the operation of the ventilation group according to the two views shown in FIGS. 1 and 2, respectively, where the suction of used-up air from the paving of the plant for the treatment of organic wastes and the subsequent exhaust of the same used-up air are performed.

FIGS. 5A and 5B schematically show the operation of the ventilation group assuming an application with flow A, i.e. in the direction from the paving to the bio-filter.

Figures 6A, 6B:
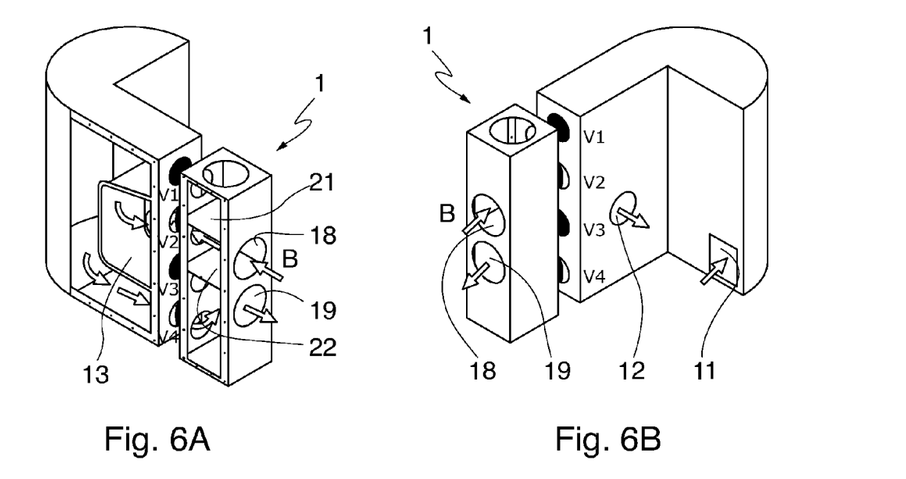
FIGS. 6A and 6B show the operation of the ventilation group according to the two views shown in FIGS. 1 and 2, respectively, where the suction of fresh air from the external environment and the blowing of the same fresh air into the paving of the plant for the treatment of organic wastes are performed.

FIGS. 6A and 6B schematically show the operation of the ventilation group assuming an application with flow B, i.e. in the direction from the external environment to the paving.

Figure 7A:
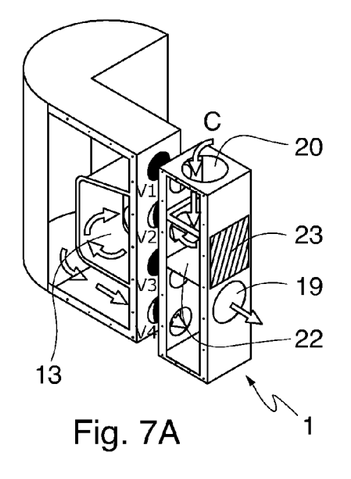
FIGS. 7A and 7B show the operation of the ventilation group according to the two views shown in FIGS. 1 and 2, respectively, where the suction of used-up air from a manifold of the plant for the treatment of organic wastes and the blowing of the same used-up air to the paving of the plant for the treatment of organic wastes are performed.
Figure 7B:
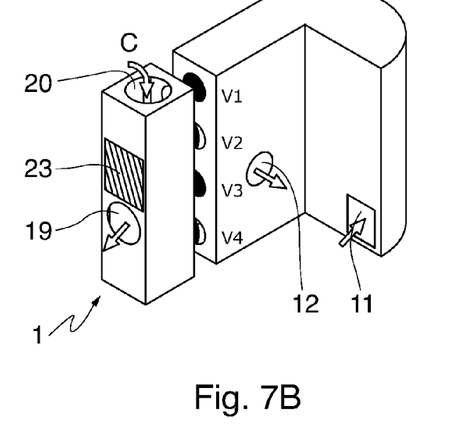

FIGS. 7A and 7B schematically show the operation of the ventilation group assuming an application with flow C, i.e. in the direction from the manifold to the paving.

Figure 8A:
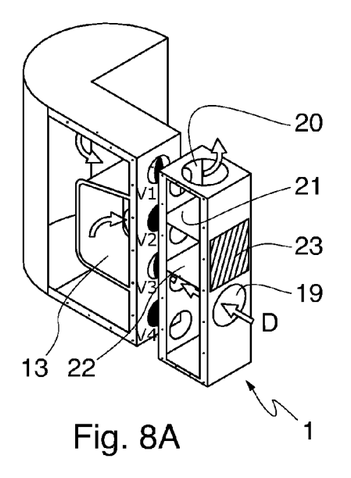
FIGS. 8A and 8B show the operation of the ventilation group according to the two views shown in FIGS. 1 and 2, respectively, where the suction of used-up air from the paving of the plant for the treatment of organic wastes and the subsequent exhaust of the same used-up air are performed.
Figure 8B:
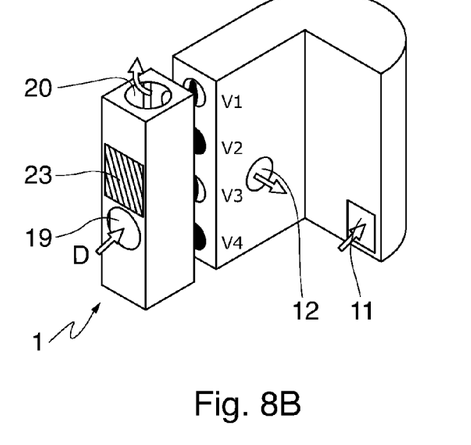

FIGS. 8A and 8B schematically show the operation of the ventilation group assuming an application with flow D, i.e. in the direction from the paving to the bio-filter and/or the manifold.

Referring to FIGS. 5A and 5B, the operation of the ventilation group according to the invention, for instance for obtaining an A-type flow, i.e. a flow from the paving to the bio-filter, is achieved with the following valve configuration:
V1-->OPEN
V2-->CLOSED
V3-->OPEN
V4-->CLOSED Such a valve configuration results in sucking used-up air from the paving through the second external hole 19 and sending the same used-up air to the bio-filter through the third external hole 20. More particularly, the flow of used-up air from the paving enters the third section 10c through the second external hole 19, passes along said third section 10c in the space below the second partition 22, enters the space defined by baffle 13 through the open third valve V3, it is sucked by fan 2 through the second opening 12 and is sent to the first section 10a through the first opening 11. After having passed along the second section 10b, such a flow enters again said third section 10c through the first valve V1, also open, and eventually it is exhausted towards the bio-filter through the third external hole 20.

Referring to FIGS. 6A and 6B, the operation of the ventilation group according to the invention, for instance for obtaining a B-type flow, i.e. a flow from the external environment to the paving, is achieved with the following valve configuration:
V1-->CLOSED
V2-->OPEN
V3-->CLOSED
V4-->OPEN Such a valve configuration results in sucking fresh air from the environment through the first external hole 18 and blowing the same fresh air into the paving through the second external hole 19. More particularly, the flow of fresh air from the external environment enters the third section 10c through the first external hole 18, passes along said third section 10c in the space defined between the first and second partitions 21 and 22, enters the space defined by baffle 13 through the open second valve V2, it is sucked by fan 2 through the second opening 12 and is sent to the first section 10a through the first opening 11. After having passed along the second section 10b, such a flow enters again said third section 10c through the fourth valve V4, also open, and it is exhausted towards the paving through the second external hole 19.

In the alternative embodiment of the present invention, referred to as "used-up air recovery" and shown in FIGS. 7A, 7B, 8A and 8B, ventilation group 1 is substantially the same as in the main embodiment described hereinbefore, with the following modifications:

i) provision of a closing plate 23 onto the first external hole 18 admitting fresh air from the external environment, so as to prevent such an admission;

ii) removal of the first partition 21 in the third section 10c of housing 10 of ventilation group 1.

Such a configuration may be attained also by making a first section 10c lacking the first external hole 18 and/or lacking the first partition 21.

Ventilation group 1 according to such an alternative embodiment can operate in two different ways, disclosed in detail hereinafter.

Referring to FIGS. 7A and 7B, the operation of the ventilation group according to the alternative embodiment of the invention, for instance for obtaining a C-type flow, i.e. a flow from the manifold to the paving, is achieved with the following valve configuration:
V1-->CLOSED
V2-->OPEN
V3-->CLOSED
V4-->OPEN Such a configuration results in sucking used-up air from the manifold of the plant for waste treatment, which conveys the process used-up air through the third external hole 20, and in blowing the same used-up air into the paving through the second external hole 19. More particularly, the flow of used-up air from the manifold enters the third section 10c through the third external hole 20, passes along said third section 10c in the space defined above the second partition 22, enters the space defined by baffle 13 through the open second valve V2, it is sucked by fan 2 through the second opening 12 and is sent to the first section 10a through the first opening 11. After having passed along the second section 10b, such a flow enters again said third section 10c through the fourth valve V4, also open, and it is exhausted towards the paving through the second external hole 19.

Referring to FIGS. 8A and 8B, the operation of the ventilation group according to the alternative embodiment of the invention, for instance for obtaining a D-type flow, i.e. from the paving to the bio-filter and/or the manifold, is achieved by changing the position of or closing the first partition 21 and with the following valve configuration:

V1-->OPEN
V2-->CLOSED
V3-->OPEN
V4-->CLOSED

Such a configuration results in sucking used-up air from the paving through the second external hole 19 and in exhausting the same used-up air towards the bio-filter and/or the manifold through the third external hole 20. More particularly, the flow of used-up air from the paving enters the third section 10c through the second external hole 19, passes along said third section 10c in the space defined below the second partition 22, enters the space defined by baffle 13 through the open third valve V3, it is sucked by fan 2 through the second opening 12 and sent to the first section 10a through the first opening 11. After having passed along the second section 10b, such a flow enters again said third section 10c through the first valve V1, also open, and eventually it is exhausted towards the manifold through the third external hole 20.

Figure 9A:
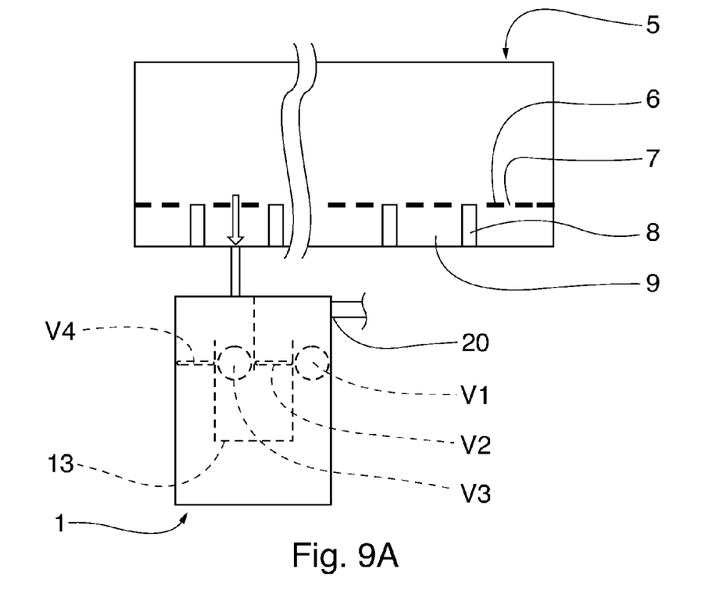
FIG. 9A shows the ventilation group according to the invention, associated with a plant for the treatment of organic wastes and sucking from the paving of the same plant.
Figure 9B:
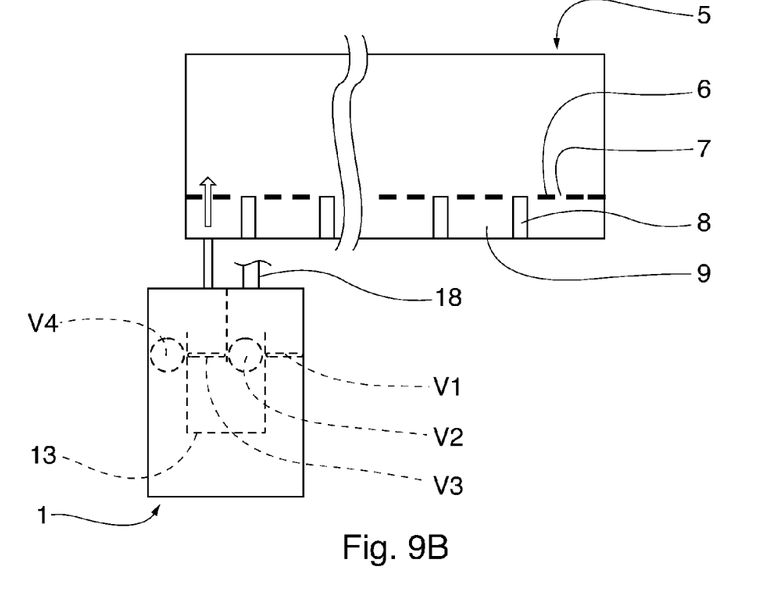
FIG. 9B shows the ventilation group according to the invention, associated with a plant for the treatment of organic wastes and blowing into the paving of the same plant.

Referring to FIGS. 9A and 9B, there is shown an exemplary assembly formed by the ventilation group according to the present invention associated with a plant 5 for the treatment of organic wastes. Said plant 5 is of the kind described in the above-mentioned European Patent No. EP 1 431 262 and, therefore, comprises a ventilated paving or floor on which heaps of organic wastes to be treated are deposited, the aerobic treatment of said organic wastes taking place through a phase of fermentation/bio-oxidation performed by means of forced air.

Said ventilated paving comprises a plurality of tiles 6 having openings 7 and resting upon partitions 8 so as to form a pressure equalising plenum 9 under the tiles.

More particularly, FIG. 9A shows ventilation group 1 when sucking from the paving of plant 5: as shown, valves V1 and V3 are open and valves V2 and V4 are closed, so that an A-type or a D-type flow is obtained.

On the contrary, FIG. 9B shows ventilation group 1 when blowing to the paving of plant 5: as shown, valves V1 and V3 are closed and valves V2 and V4 are open, so that a B-type or a C-type flow is obtained.

Air flow reversal, i.e. the passage from the phase of sucking from the paving to that of blowing to the paving, and vice versa, is determined, preferably in automatic manner, by detecting significant parameters of the microbial activity, such as the O2 content and the temperature of the material or the air deriving therefrom. Such parameters, individually or in combination, allow adjusting the waste treatment process by following management schemes that are developed according to known kinetics or kinetics determined for the purpose.

The ventilation group according to the present invention is preferably made of metal materials, such as steel, or other materials capable of resisting the possible chemical attack by certain components possibly present in particular in the flow of used-up air from the plant for the aerobic treatment of organic wastes.

The preceding detailed description clearly shows the advantages inherent in using the ventilation group for flow reversal according to the present invention, more particularly:
 operation flexibility;
 constructional simplicity and compactness;
 simplicity and rapidity by which the flow direction reversal is achieved, what allows minimising management times;
 minimisation of moving mechanical parts, with the resulting reduction of wear and dead times for maintenance interventions.

It is clear that the ventilation group for flow reversal according to the present invention, described here with reference to a preferred embodiment and to a variant given by way of non-limiting examples, can be modified in manners known to the skilled in the art, without thereby departing from the scope of the present invention. In particular, the ventilation group for flow reversal according to the present invention has been envisaged for use in combination with plants for the aerobic treatment of organic wastes of the kind described in European Patent No. EP 1 431 262, but it can be advantageously applied in all production plants requiring an air flow reversal.

The invention claimed is:

1. A ventilation group for flow reversal, comprising a fan associated with a housing inside which there are defined:
 a first chamber receiving flow blown by the fan;
 a second chamber from which the flow is drawn into the fan;
 a first pair of paths for the ventilation flow, associated with said first chamber;
 a second pair of paths for the ventilation flow, associated with said second chamber;
 a third chamber associated with
  a first path in said first pair of paths, and
  a first path in said second pair of paths;
 a fourth chamber associated with
  a second path in said first pair of paths, and
  a second path in said second pair of paths;
 wherein said paths are intercepted by corresponding valves that may take, in pairs, a closed or an open configuration such that only one path at a time in each pair of paths is activated, whereas the other two paths are deactivated; and
 wherein said third chamber is divided into two sub-chambers, a first sub-chamber associated with said first path in said first pair of paths and a second sub-chamber associated with said first path in said second pair of paths.

2. The ventilation group as claimed in claim 1, wherein said housing includes:
 a baffle externally defining said first chamber and internally defining said second chamber;
 a first opening and a second opening for connecting said fan with said housing, said first opening and said second opening being associated with said first chamber and said second chamber, respectively;
 a first external hole associated with one path in said second pair of paths and/or a second external hole associated with one path in said first pair of paths and one path in said second pair of paths, and a third external hole associated with one path in said first pair of paths;
 first internal holes and second internal holes facing said first internal holes, each of said first and second internal holes being associated with a corresponding one of said paths.

3. The ventilation group as claimed in claim 2, wherein said valves are mounted in seats formed by said first internal holes and said second internal holes.

4. The ventilation group as claimed in claim 1, wherein said valves are controlled by a single actuator and are throttle valves arranged in line and oriented at 90° relative to each other.

5. The ventilation group as claimed in claim 2, wherein said housing includes a first section with a half-cylinder shape, a second section shaped as a parallelepiped with rectangular cross section, and a third section shaped as a parallelepiped with square cross section, said sections being connected to one another.

6. The ventilation group as claimed in claim 5, wherein said second section is connected, at one end, to said first section so as to form an L-shaped structure, and is connected, at the end opposite with respect to said first section, to said third section, which therefore forms an extension thereof, said L-shaped structure favouring the positioning of a fan equipped with an intake duct and a delivery duct arranged at 90° relative to each other.

7. The ventilation group as claimed in claim 6, wherein said first section is substantially empty and includes said first opening for the connection of the delivery duct of the fan.

8. The ventilation group as claimed in claim 6, wherein said second section includes said second opening for connection of the intake duct of the fan, said four first internal holes and said baffle, said baffle being so located that it internally encloses the central holes among said four first internal holes as well as said second opening.

9. The ventilation group as claimed in claim 6, wherein said third section includes said four second internal holes corresponding to and facing said four first internal holes, and said first external hole and/or second external hole and third external hole, said first and/or second external holes being located on the face opposite that having said four second internal holes, said third external hole being located on the face opposite the face by which said third section rests on the ground, and wherein a first partition and/or a second partition are provided upstream and downstream said first external hole.

10. The ventilation group as claimed in claim 9, wherein said third section further includes a closing plate that can be placed on said first external hole.

11. The ventilation group as claimed in claim 9, wherein said first partition is movable.

12. A plant for the treatment of organic wastes, characterised in that it includes a ventilation group as claimed in claim 1.

13. The plant as claimed in claim 12, wherein the ventilation group is configured so as to draw air from the environment outside said plant.

14. The plant as claimed in claim 12, wherein the ventilation group is configured so as to draw used-up air from the environment inside said plant.

* * * * *